US005462253A

United States Patent [19]

Asthana et al.

[11] Patent Number: 5,462,253

[45] Date of Patent: Oct. 31, 1995

[54] DUAL SLOPE FLOW CONTROL VALVE

[75] Inventors: Anjan Asthana, Philadelphia, Pa.; James P. Henry, Indianapolis; Melissa A. Hamilton, Anderson, Ind.

[73] Assignee: General Motors Corporation, Detroit, Mich.

[21] Appl. No.: 279,139

[22] Filed: Jul. 22, 1994

[51] Int. Cl.[6] .......... F16K 31/06

[52] U.S. Cl. .......... 251/121; 251/129.05; 251/129.08; 251/129.16; 251/210

[58] Field of Search .......... 251/120, 121, 251/210, 129.05, 129.08, 129.16

[56] References Cited

U.S. PATENT DOCUMENTS

| | | | |
|---|---|---|---|
| 1,308,118 | 7/1919 | Shane | 251/210 |
| 2,749,079 | 6/1956 | Desjarlais | 251/210 X |
| 3,033,323 | 5/1962 | Lamanna | 251/121 X |
| 4,012,175 | 3/1977 | Simonds, Jr. | 417/316 |
| 4,506,859 | 3/1985 | Schmidt | 251/210 X |
| 4,561,460 | 12/1985 | Smith | 137/493.2 |
| 4,610,424 | 9/1986 | Koppers | 251/121 |
| 4,662,604 | 5/1987 | Cook | 251/129.07 |
| 4,793,373 | 12/1988 | Weitschorke-Muhsold et al. | 137/116.5 |
| 4,830,333 | 5/1989 | Watson | 251/129.18 |
| 4,840,350 | 6/1989 | Cook | 251/129.11 |
| 4,951,637 | 8/1990 | Cook | 123/520 |
| 4,979,542 | 12/1990 | Mesenich | 137/625.65 |
| 5,083,546 | 1/1992 | Detweiler et al. | 123/520 |
| 5,094,218 | 3/1992 | Everingham et al. | 123/571 |
| 5,115,785 | 5/1992 | Cook | 123/520 |

*Primary Examiner*—Robert G. Nilson

*Attorney, Agent, or Firm*—Jeffrey A. Sedlar

[57] ABSTRACT

A fluid flow control valve actuated by a solenoid to selectively position the valve by balancing electromagnetic forces, spring forces and fluid forces within the valve. The valve includes a plurality of flow control orifices in series that provide flexible dual slope flow performance characteristics, precise flow control and high flow capability directed to use as a vehicle's evaporative emission control system purge valve.

12 Claims, 2 Drawing Sheets

DUAL SLOPE FLOW CONTROL VALVE

BACKGROUND OF THE INVENTION

The present invention relates to an electromagnetically actuated flow control valve.

Flow control valves of numerous variety are available that provide many types of flow characteristics, often tailored to specific applications. These valves typically provide a single flow performance slope characteristic over the valve's full range of flow rates. A single slope valve does not suit the requirements of a flow system where very precise control is desired over a low flow rate range and controlled, low restriction flow is desired over a high flow range.

In order to achieve high flow rates a valve must have a relatively large flow path. A large flow path diminishes a valve's ability to provide precise control under low flow rate conditions. Therefore, to provide both high flow and precisely controlled low flow characteristics, two parallel valves are typically used in a flow system when these functions are required. Valves have been designed with a plurality of flow paths each including an obturator that act as two separate parallel valves to provide dual flow slope characteristics.

An example of a flow system that requires both high flow and precisely controlled low flow characteristics is a vehicle's evaporative emission control system. Valves used as purge valves in vehicle evaporative emission control systems are generally solenoid or vacuum-diaphragm actuated and include those operated by a pulse-width modulated signal to provide variable control of purge flow rates.

Purge valves operate to selectively open a normally closed communicative passage between the evaporative emission control system's storage canister and the induced vacuum of an internal combustion engine's intake system. The working fluid is an air and fuel vapor mixture in varying ratios. Due to the varying proportionality of the air and fuel vapor in the fluid mixture and the range of engine operating states, precision flow control capabilities are required of the purge valve.

A vehicle's engine operates at various states and under a wide range of conditions. The fuel supply system is closely controlled and under some specific, identifiable, operating conditions the introduction of collateral fuel vapors from the evaporative emission control system is undesirable. One such vehicle operating condition where an evaporative emission control system canister purge must be executed with precise flow rate control to assure desirable engine performance is engine idle.

It is preferable to provide a means of precisely controlling purge flow at low flow rates during non-preferred purge states including engine idle to minimize unwanted effects, while providing controlled high flow rates at engine operating conditions more amenable to purge flow. Therefore, a valve that provides these flow control characteristics is needed.

SUMMARY OF THE INVENTION

A dual slope flow control valve according to the present invention is directed to providing an enhanced level of control in flow control valves. The valve exhibits dual slope flow performance characteristics particularly suitable for applications involving a combination of closely controlled low flow rate conditions and low restriction high flow rate conditions. A purge valve for a vehicle's evaporative emission control system is an example of a particular application in which the valve can be used. Therefore, the valve is designed to function as a flow control valve providing the purge function in an evaporative emission control system, although the features provided may find use in other flow control applications.

The flow control configuration combines the advantages of a sliding member spool-type valve with those of a mating poppet and seat type valve. The spool part of the valve's configuration is directed to providing high flow capability at reduced actuation forces, precise control at low flow rates and flexibility in flow performance slopes through amenability to changes in slot or port arrangement. Dual slope flow function characteristics are provided through a specifically designed orifice configuration, with high flow steep slope and low flow gradual slope performance characteristics substantially controlled by a single slot orifice. The poppet tip and seat part of the valve's configuration is directed to providing enhanced ability to reach tighter leakage specifications, beyond those that a sliding member valve is generally capable of. A unique combination of flow control orifices is directed to providing flexible flow control slopes.

The valve's spool part along with the poppet tip and seat part work in conjunction with the orifices to provide flow control characteristics directed, for example, to use in evaporative emission control system purging. The flow characteristics of the valve provide two distinct performance curve slopes, a gradual slope for low flow and a steeper one for high flow conditions along certain selected segments of poppet travel. The specific arrangement, as used in evaporative emission control system purging, is directed toward initiating purges during engine idle and providing high flow rates during engine operating conditions that can accept higher collateral purge evaporate flow. The corresponding change from a low flow valve to a high flow valve is accomplished through the combination of poppet and sliding member characteristics in the valve and the preferred in-series orifice arrangement. The present invention is amenable to providing various flow control slopes through changes in the flow orifices or spool and poppet configuration, adding flexibility in tailoring the valve to a particular application.

An electromechanical actuator in combination with the valve according to the present invention is directed to enhancing the level of flow control provided by the valve. In summary the device operates as a low frequency analog flow controller. A signal from the vehicle's electronic controls determines the amount of flow to be permitted through the valve. The amount of flow depends on how favorable engine operating conditions are to purging.

As the duty cycle of a constant frequency electrical pulse-width modulated signal is varied the actuator and valving mechanisms assume differing equilibrium positions corresponding to differing flow rates. Equilibrium is established through a balance of interacting electromagnetic, spring and pneumatic axial forces within the valve and actuator assembly. Low frequency operation of the actuator is directed to minimizing undesirable hysteresis in the analog performance of the device. Additionally, in combination with the vehicle's electronic control system, a precise degree of control is afforded at all flow rates, particularly at low flow rates.

An object of the invention is to provide a valve having precise flow control capabilities particularly at low flow rate conditions. Another object of the invention is to provide multiple flow performance slopes from a single valve. A further object of the invention is to provide a valve that is controllable in a variable fluid force stream.

The preferred embodiment of the invention as detailed in the following illustration and description is directed to providing the above stated features, advantages and objects.

DETAILED DESCRIPTION OF THE PRESENTLY PREFERRED EMBODIMENTS

Figure 1:
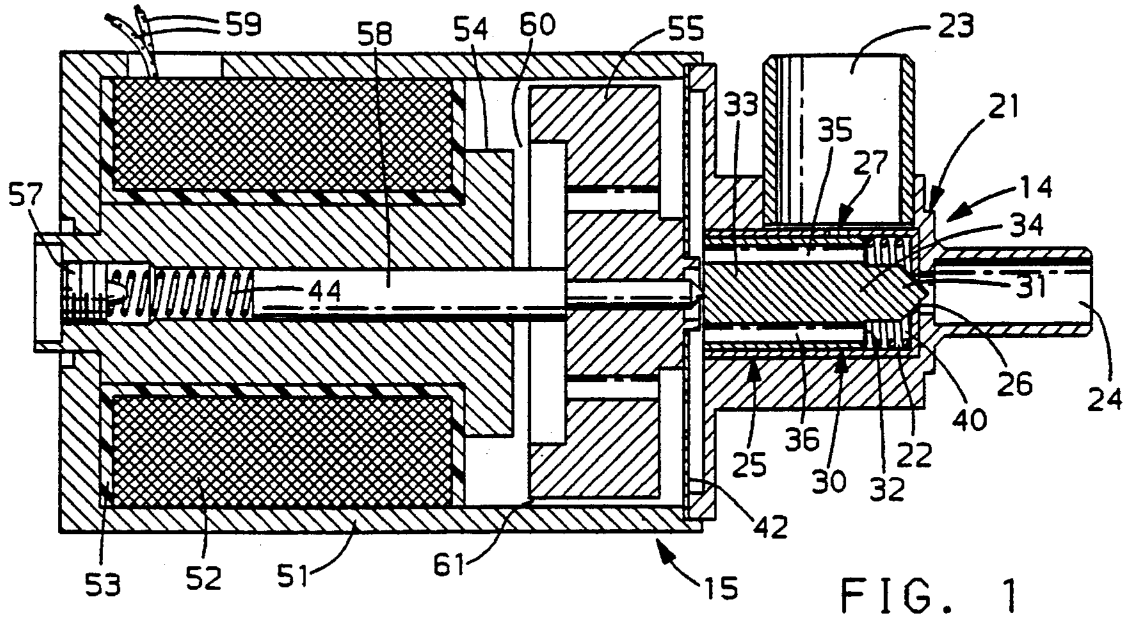
FIG. 1 is a sectional view of a dual-slope flow control valve.

Illustrated in FIG. 1 is a dual-slope flow control valve according to this invention and which is described in the environment of a vehicle evaporative emission control system. The valve comprises a combination of a valve assembly 14 and an actuator assembly 15 in a unitary design. The valve assembly 14 is contained by a housing 21 with two flow ports 23 and 24 for connection to the evaporative emission control system (not shown).

Preferably, the inlet port 23 is adapted to receive a mixture of air and fuel vapor flow from a vehicle's evaporative emission control system and the outlet port 24 is adapted to communicate with the engine's intake system (not shown) to induce flow through the valve. According to this invention the valve controls the amount of flow between the evaporative emission control system and the engine.

When a vehicle engine is operating at or near idle conditions with high vacuum levels, low or no purge flow rates are desirable while higher flow rates are preferable when the engine is operating at high speed or load conditions and vacuum levels are lower. Therefore, it is desirable to have variable minimum flow rates at high vacuum pressures in the outlet port 24 and variable maximum flow rates at low vacuum pressure in the outlet port 24. Because the vacuum pressure is what induces flow through the valve, to provide these functions it is preferable for the valve to operate in a non-linear fashion.

The valving mechanism combines features of a seated poppet type valve with those of a spool type valve. Between the inlet port 23 and the outlet port 24 within the valve housing 21 is a flow path. The flow path through the valve is comprised of inlet port 23, poppet chamber 22 that is lined with sleeve 25 and outlet port 24. At the threshold of the outlet port 24 through sleeve 25 is round seat orifice 26.

Within sleeve 25 is a generally cylindrically shaped poppet 30 providing coordinated action as a spool valve and a poppet valve. The poppet includes a spool-like body 33, an annular shoulder portion 32, with a neck portion 34 extending therefrom and terminating in the angled poppet tip 31.

Seat orifice 26, in combination with the conical shaped angled poppet tip 31, defines an equivalent poppet tip and seat orifice. Through the coaction of seat orifice 26 and poppet tip 31 the equivalent poppet tip and seat orifice provides a variable flow path restriction disposed between poppet chamber 22 and outlet port 24.

The angled tip 31 of the poppet 30 communicates with the seat orifice 26 to provide a means for sealing the outlet flow port 24. The angled tip 31 acts to center the poppet 30, resulting in an effective seal between the poppet tip 31 and the seat orifice 26.

Orifices 35 and 36 extend through poppet spool-like body 33. The orifices 35 and 36 work to balance fluid forces acting on opposite ends of the poppet 30 by providing a path for fluid to communicate therethrough. The angled tip 31 of the poppet 30 is disposed at the valve's seat orifice 26 in the threshold of the outlet flow port 24 of the valve assembly 14. Tip 31 is therefore subject to negative pressure conditions at the outlet which is connected via a conduit (not shown) to the engine intake.

The poppet's spool-like body 33 is in communication with contact spring 40 at its shoulder 32 and with actuator rod 58 at the opposite end. The poppet 30 is biased toward the actuator 15 by contact spring 40. The contact spring 40 overcomes vacuum fluid force acting on the poppet tip 31 to keep the poppet 30 in communication with the rod 58 as it repositions. Except for the force of contact spring 40 biasing poppet 30 against rod 58, the poppet 30 is otherwise free floating within the sleeve 25. The angled tip 31 of the poppet 30 results in reduced pressure force effect on the poppet 30 in the seating gap and works in conjunction with the contact spring 40 by minimizing the force required to overcome the fluid force in unseating the poppet 30.

Slot orifice 27 is located at the threshold of the inlet port 23 through the sleeve 25 and adjacent to the poppet's shoulder 32. Slot orifice 27 defines a variable flow path restriction disposed between poppet chamber 22 and inlet port 24. Through coaction with the poppet body 33 and shoulder 32, slot orifice 27 provides a dual flow performance slope characteristic to the valve.

Figure 2:
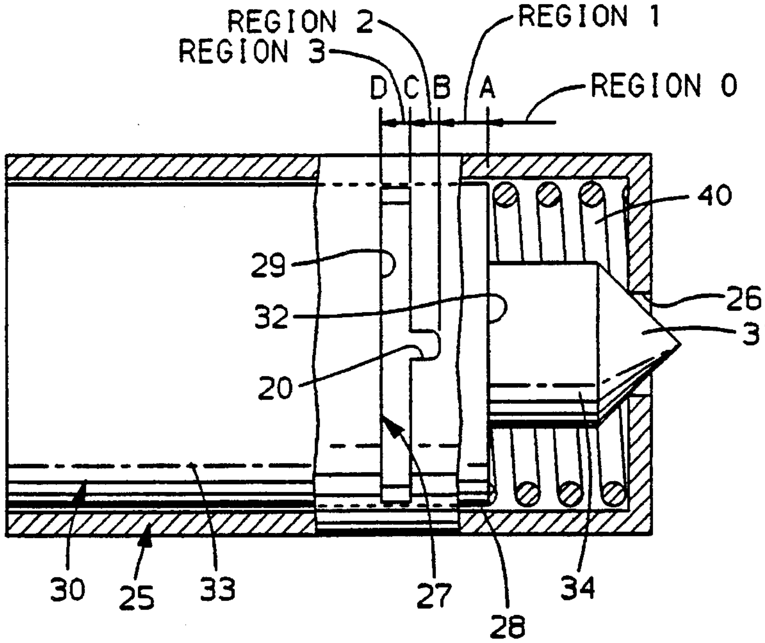
FIG. 2 is a detail sectional view of the poppet and flow ports.

For applications involving an evaporative emission control system purge valve the slot orifice 27 exhibits a T-slot configuration as better shown in FIG. 2. The area of the preferred T-slot orifice 27 can be changed to produce varying flow characteristics allowing for flexibility in design of the valve and permitting tailoring flow characteristics to specific applications. The T-slot includes a longitudinal leg 20 parallel to the valve's axis and a lateral leg 29 perpendicular to the valve's axis.

The poppet spool-like body 33 and shoulder 32 cooperate with the slot orifice 27 to provide a precise degree of flow control at both low and high flow conditions, with dual flow slope characteristics. A gradual flow versus travel slope characteristic is produced at low flow rates through the longitudinal leg 20 of the T-slot 27 and a steeper slope at higher flow rates through the lateral leg 29 of the T-slot 27. Details of the control scheme are described below.

By providing a durable insert comprised of sleeve 25 having flow control orifices 26 and 27 therethrough, the valve's housing 21 can be inexpensively molded while the orifices are precisely formed. This feature also provides durability against wear, maintaining the precise nature of the valve.

Between the spool-like body 33 of poppet 30 and the sleeve 25 is an equivalent clearance orifice 28, which is the annular shaped space that allows the poppet to move axially and is typical of a sliding member valve arrangement. Inherent in this type of arrangement is some fluid leakage through the equivalent clearance orifice 28. The leakage is utilized in conjunction with the sealing capability of the poppet tip 31 to provide a smooth transition from no flow to opening flow characteristics.

Within sleeve 25 the spool shaped poppet 30 operates in conjunction with seat orifice 26 at the poppet tip 31, clearance orifice 28 between the spool-like body 33 of poppet 30 and the sleeve 25 and slot orifice 27 at the poppet's shoulder 32 to control flow.

Flow through the valve is controlled by a preferred in-series arrangement of orifices. The flow control arrangement for a dual slope flow control valve according to an object of the present invention includes a poppet seat orifice 26, an equivalent clearance orifice 28 and a T-slot orifice 27. In combination with electromagnetic positioning these features are directed to providing precise flow control under variable conditions. In application with the valve installed in an evaporative emission control system this arrangement provides key control characteristics at critical points in the flow pattern.

The preferred flow control mechanism is configured to provide low flow at initial poppet 30 travel, preferably with control signal duty cycles up to approximately 50%. This range of precise control, providing small incremental changes in flow rate in response to poppet movement, optimizes the flow characteristics of the valve when initially opening. The orifice arrangement ensures a gradual opening flow with a smooth transition from a seated position to opening flow, thereby eliminating pop-off problems generally associated with poppet type valves. This characteristic is directed to initiating purge cycles while the vehicle's engine is at idle speeds where initial bursts of flow would have unwanted effects on engine performance and vehicle emission control.

At engine operating conditions more amenable to purge flow when high levels of flow are preferred to efficiently purge the evaporative emission control system, the valve provides preferable high flow characteristics. The corresponding change from a low flow valve to a high flow valve is accomplished through the combination of poppet and sliding member characteristics in the valve, and the preferred orifice arrangement.

Connected to the valve assembly 14 is the actuator assembly 15. The actuator assembly 15 includes a frame 51 comprised of a ferromagnetic material and substantially in the shape of a cylindrical container with a closed end. An annular coil 52 formed of a plurality of turns of wire wound on a bobbin 53 with electrical leads 59 for communication with control electronics (not shown) is positioned within frame 51 near the closed end. A pole piece hereinafter called a stop and designated as 54 comprised of a ferromagnetic material extends from the closed end of frame 51 through the coil 52.

Stop 54 is disposed through the coil 52 and on the one end is in communication with the frame 51. At the opposite end the stop 54 is configured with a radially projecting ring disposed adjacent to the end of the coil bobbin 53. The radially projecting ring of stop 54 in combination with the cylindrical frame 51 forms an annular space between stop 54 and frame 51. A plunger shaped disk armature 55 comprised of a ferromagnetic material is positioned for movement in the space between frame 51 and stop 54. Integral constituents of the actuator include the working air gap 60 and the secondary air gap 61.

The actuator's magnetic circuit includes armature 55, stop 54 and frame 51. Magnetic flux is generated by coil 52 positioned within frame 51. The armature 55 is situated in the magnetic circuit between the stop 54 and the frame 51. The working air gap 60 lies between the stop 54 and the armature 55 with the secondary or parasitic air gap 61 located between the armature 55 and the frame 51. Also of importance to the actuator's performance are the magnetic circuit's lines of flux (not shown). The flux traverses the air gaps and induces a variable electromagnetic force that acts upon the armature 55 to axially position it to provide selected flow rates through the associated positioning of poppet 30.

The magnetic circuit configuration results in placement of the working air gap 60 at a maximum radial distance from the axis for this package size. The disk armature 55 is disposed entirely outside the coil bobbin 53 and extends radially, with an annular leg disposed between the frame 51 and the stop 54 such that the electromagnetic force on the armature 55 is optimized. To optimize the electromagnetic force the reluctance of the magnetic circuit is minimized by placing the air gaps 60 and 61 in the magnetic flux path at a maximum radial distance thereby providing a maximum interface area for flux transfer. The interface area is maximized by the axisymetrical configuration of the circuit and the optimal radial placement. The space defined between the stop 54 and the frame 51 is great enough to minimize flux leakage between the two. The radial distance of the mean position of the two air gaps 60 and 61 is optimized to obtain the maximum flux transfer area with minimum flux leakage.

Therefore, the magnetic circuit configuration results in optimized axial forces on the armature 55 for a given actuator size. The space is efficiently utilized for the coil 52 and the axisymetric magnetic components. This configuration is directed to producing relatively large force over long strokes.

The actuator 15 preferably functions as a non-linear solenoid. Conventional engine electronic controls (not shown) deliver a pulse-width modulated signal to actuator assembly 15. Electromagnetic force develops as a function of current input and armature position. Armature position results from a balance of electromagnetic force, spring forces and fluid forces. Therefore, the valve operates on a force balanced principle.

During low flow operation of the valve, fluid forces acting on the valve are generally high. This occurs due to two circumstances. First, when the valve is closed or nearly closed fluid balancing poppet orifices 35 and 36, do not alleviate fluid forces acting on the poppet tip 31 which is disposed in the seat orifice 26 and subjected to engine vacuum. Second, when purges are initiated during engine idle the fluid force resulting from the engine's induction system vacuum is considerably higher than that present during high flow conditions when the engine is operating under high speed or load conditions.

Therefore, the magnetic circuit is configured to provide maximum axial force early in the armature travel when fluid force on the poppet 30 is high, with reduced force occurring at greater armature travel to correspond with reduced fluid force acting on the poppet 30 and when high flow characteristics in the valve are preferred. This is accomplished by the physical arrangement of the actuator's magnetic circuit components within the lines of magnetic flux. The developed force is greatest early in the travel of the armature 55 away from a normal position corresponding to a biased closed condition of the valve 14. The corresponding reduction in electromagnetic force, later in the armature travel, further from the normal position, compliments the balance of forces operation of the valve.

A non-magnetic actuator rod 58 is disposed along the valve's axis, is connected to armature 55 and extends through the actuator 15. Rod 58 is in communication with the poppet 30 on one end to effect positioning of poppet 30 in response to movement of the armature 55. At the opposite end of the rod 58 from the poppet 30 is a regulation spring 44. The regulation spring 44 includes an adjustment screw 57 to set the amount of closing bias force applied to the rod 58 for balancing with the electromagnetic force and fluid forces, providing predetermined precise operating characteristics in positioning poppet 30.

The magnetic force operating on the valve balances the regulation spring 44 force and the fluid force at equilibrium points in relation to a variable duty cycle signal. The electronically controlled signal provides a means for selecting the point of equilibrium in valve travel to provide a desired rate of flow through the valve depending on the associated vehicle's engine operating conditions. Also acting axially on the valve are nominal contact spring 40 and flexure spring 42 forces.

The flexure spring 42 in combination with nonmagnetic rod 58 forms a radial bearing for the moving armature-rod assembly. The radial bearing capability of the flexure spring 42 and rod 58 securely maintain the air gaps 60 and 61 about the armature. The flexure spring 42 produces a nominal axial force in the balance of forces acting axially on the system.

In operation a low frequency pulse-width modulated voltage with, for example, a frequency of 16 hertz and amplitude of 12.5 volts is applied to the coil 52. Magnetic flux is thereby generated by coil 52. The magnetic flux is largely confined to a path consisting of frame 51, stop 54, movable armature 55 and air gaps 60 and 61. The flux induces an electromagnetic axial force on the armature 55, causing the armature-rod assembly to move away from the normal position, compressing the regulation spring 44 and opening the valve to a selected position. The pulse-width modulated control mechanism positions the valve with a variable magnetic force by varying the control signal's duty cycle.

Initial valve opening positions correspond with a need to provide precise levels of flow control. The initial positions are gained through a signal with low duty cycles. To establish the required accurate poppet 30 positioning and therefore, precise flow control, a circuit with a relatively long electrical response is provided. Therefore, the coil 52 is designed with high inductance properties. System inductance varies as a function of armature 55 travel. Inductance is higher when the flux path is more efficient. The flux path of actuator assembly 15 is most efficient early in the travel of armature 55 when air gap 60 is most efficient.

When system inductance is higher, the electrical response of actuator assembly 15 is longer, and therefore, more accurate flow control is established at lower duty cycles when system inductance is relatively higher. The dual slope valve is designed with a high inductance coil to initially provide the moving members with a slow response for precise control and to eliminate overshoot. The high inductance results in a non-linear build-up of average current with respect to the linear increases in duty cycle of the electrical pulse-width modulated signal. This yields a non-linear force versus travel curve, illustrated in FIG. 5, giving the desired flow versus duty cycle performance curve illustrated in FIG. 3.

As the duty cycle of the electrical pulse-width modulation signal is varied, the armature 55, rod 58 and poppet 30 move in concert to assume different equilibrium positions. The equilibrium is established through an axial force balance of electromagnetic force, spring forces and fluid force. Throughout the axial valve travel the T-slot orifice 27, equivalent clearance orifice 28 and the seat orifice 26 in series provide distinctive flow control characteristics.

The flow control mechanism can be explained as four travel regions as illustrated in FIG. 2. Region 0 is comprised of one point and is depicted in FIG. 2 as the point in travel where the poppet's shoulder 32 is located at position A. In region 0, absent a control signal, the valve is biased closed by the regulation spring 44 with the poppet tip 31 forced against the seat orifice 26 providing a secure fluid seal. Therefore, in flow region 0, the poppet tip 31 through coaction with the seat orifice 26 provides a no-flow characteristic.

When the associated vehicle engine is running, a negative pressure or vacuum is induced in the outlet port 24 of the valve. The vacuum acts on the poppet tip 31, applying an axial fluid force working to keep the valve closed. When the poppet 30 is unseated, the angled tip 31 of the poppet 30 operates to reduce the effect of this force thereby reducing the required force that must be presented by the contact spring 40 to overcome the fluid force and maintain contact between the poppet 30 and the rod 58 when the actuator acts to retract the rod 58.

Flow region 1 encompasses the travel of the poppet's shoulder 32 between positions A and B as indicated in FIG. 2. In flow region 1, as an electromagnetic force begins to draw upon the armature 55 allowing the poppet tip 31 off the closed position, the poppet shoulder 32 moves toward the longitudinal leg 20 of the T-slot orifice 27. However, in this region the T-slot orifice is not yet exposed.

The equivalent clearance orifice 28 is a small clearance orifice between the outside diameter of the poppet 30 and the inside diameter of the sleeve 25. In this flow region at the point of first flow the equivalent clearance orifice 28 in series between the T-slot orifice 27 and the equivalent poppet tip and seat orifice 26 operates to restrict flow through the valve. The relatively smaller sized equivalent clearance orifice 28 as compared to the T-slot orifice 27 acts to restrict flow for this segment of poppet travel. Therefore, in flow region 1, the equivalent clearance orifice 28 in series with the seat orifice 26, provides a variable opening flow characteristic.

The relatively small equivalent clearance orifice 28 ensures a gradual opening flow characteristic, thereby eliminating pop-off problems generally associated with poppet type valves. This feature is directed to providing a mechanism that permits initiating purge cycles when the associated vehicle engine is operating at idle speeds and bursts of flow would have significant unwanted effects.

Figure 5:
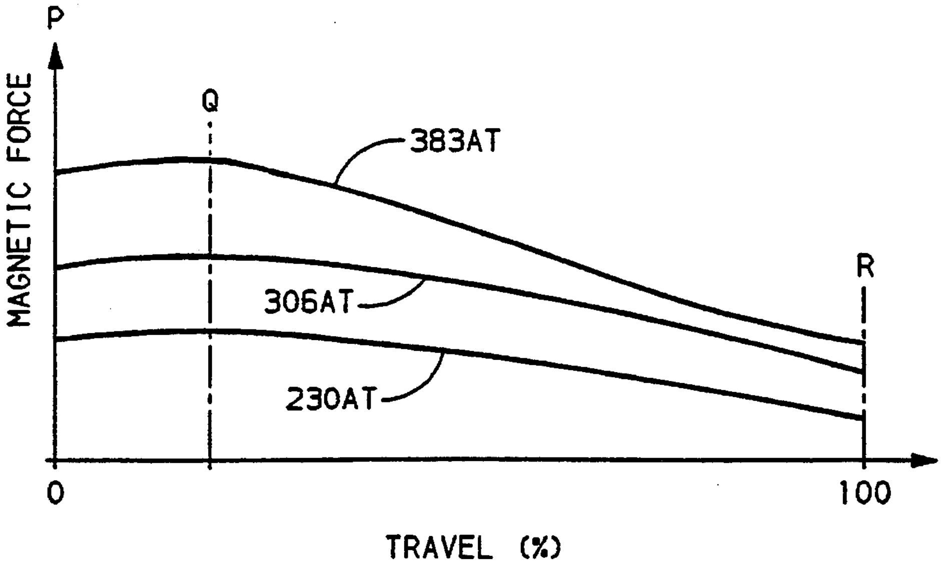
FIG. 5 is a graph of the magnetic force versus travel characteristics of the dual slope flow control valve of FIG. 1 for a plurality of Amp-Turns.

During the flow region 1 segment of travel, where flow control is the most critical, the axial electromagnetic forces provided by the actuator are relatively high and peak early in the valve's travel as illustrated in FIG. 5. After the force peaks there is a gradual reduction in the electromagnetic axial force as travel continues. As this occurs, due to the collateral reduction in fluid force on poppet 30 through the mechanism provided by the poppet body orifices 35 and 36, the force applied by the contact spring 40 is no longer entirely directed to overcoming the fluid force. The contact spring force therefore begins to act in concert with the electromagnetic force in the axial force balance, although reduced fluid forces still exist that must be counteracted to keep poppet 30 biased against rod 58.

Flow region 2 encompasses the travel of the poppet's shoulder 32 between positions B and C as indicated in FIG. 2. In flow region 2 the shoulder 32 of the poppet 30 moves along the longitudinal leg 20 of the T-slot 27, opening flow through that part of the orifice. For flow region 2 the longitudinal leg 20 provides a gradual flow slope, variable low flow characteristic.

In this segment of travel the equivalent clearance orifice 28 is effectively removed from the in-series arrangement of flow control orifices due to the incremental opening of the relatively larger slot orifice 27 to the flow path past the poppet shoulder 32. With the poppet tip 31 moved off the seat the poppet orifices 35 and 36 provide a balance of fluid force on opposing ends of the spool-like poppet body 33 of poppet 30 thereby significantly reducing the effect of fluid forces that would otherwise act upon poppet 30.

Figure 3:
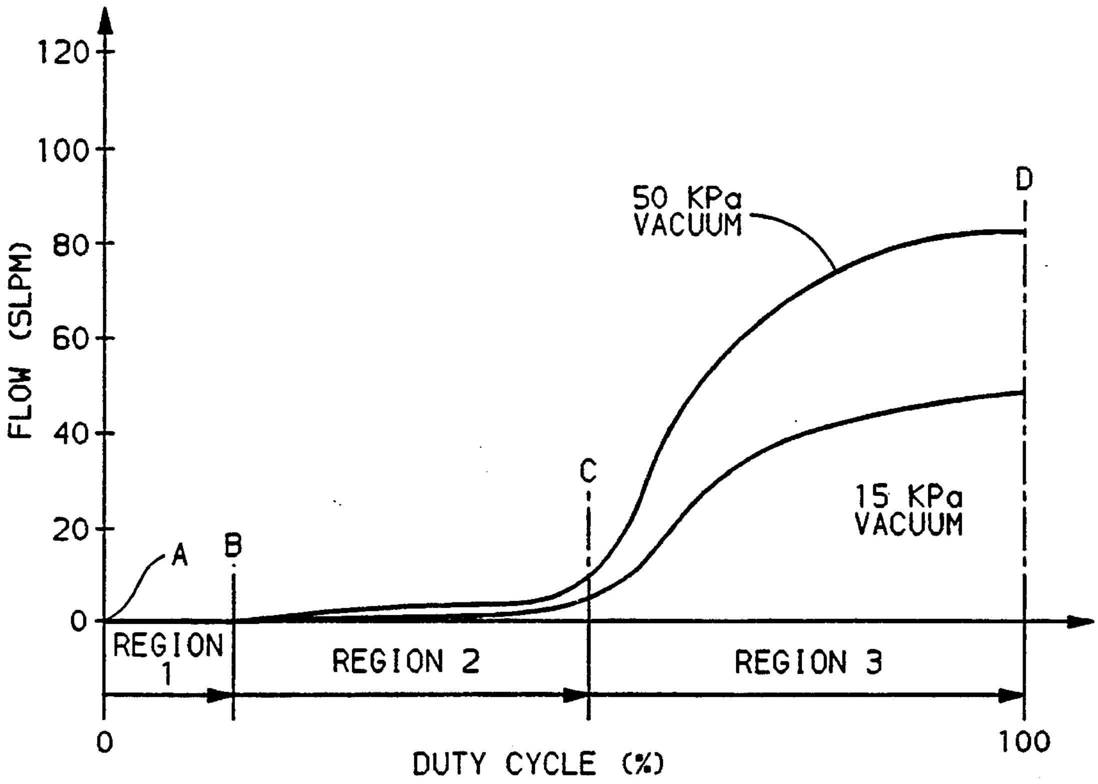
FIG. 3 is a graph of the flow versus percentage duty cycle characteristics for a plurality of vacuum pressures of the dual-slope flow control valve of FIG. 1.

The poppet tip angle 31 and seat orifice diameter 26 are configured such that at the end of travel through flow region 1 the area of the equivalent poppet tip and seat orifice is substantially greater than, such as five times, the area of the longitudinal leg of the T-slot. This relationship of areas results in the T-slot acting as the restrictive orifice in the series of T-slot orifice 27 and seat orifice 26 along the flow path. The width of the longitudinal leg 20 of the T-slot 27 therefore determines the flow versus travel slope of the valve's performance curve as shown in FIG. 3, for approximately the initial fifty percent of valve travel. This characteristic remains true for the entirety of flow region 2.

Flow region 3 encompasses the travel of the poppet's shoulder 32 between positions C and D as indicated in FIG. 2. Flow region number 3 corresponds with positioning of the valve in the travel segment where the poppet shoulder 32 moves through the area of the transverse leg 29 of the T-slot opening 27, revealing a significantly wider incremental slot area as it travels. This corresponds with an identifiably different flow versus travel slope than flow region 2 as shown in FIG. 3, for approximately the final fifty percent of valve travel. For flow region 3, the lateral leg 29 provides a steeper flow slope, variable high flow characteristic.

After a certain portion of the slot's lateral leg 29 is uncovered, the T-slot flow area becomes comparable to that of the seat orifice. The output flow from the valve is therefore determined as a result of the combined T-slot orifice 27 and seat orifice 26 in series. In this flow region segment of valve travel the amount of exercisable flow control remains at a precise level, although no longer as precise as flow regions 1 or 2.

Equilibrium positions along the valve's travel preferably fall within flow region 3 when high levels of purge flow are acceptable to the engine's performance. This generally corresponds with a lower engine vacuum pressure available to induce flow through the valve. Therefore the transverse leg 29 of the T-slot 27 has a significantly larger open area than the longitudinal leg 20 to provide the preferred high flow rates.

The mechanisms described in relation to the various flow control regions are flexible and can be varied to tailor the valve to provide specific desired flow characteristics. The mechanism used to achieve dual-slope in this case can readily be applied to different combinations of slope characteristics by using different slot shapes and dimensions, poppet shape and angle, seat diameter, poppet and sleeve equivalent clearance orifice size and different slot orifice placement.

Figure 4:
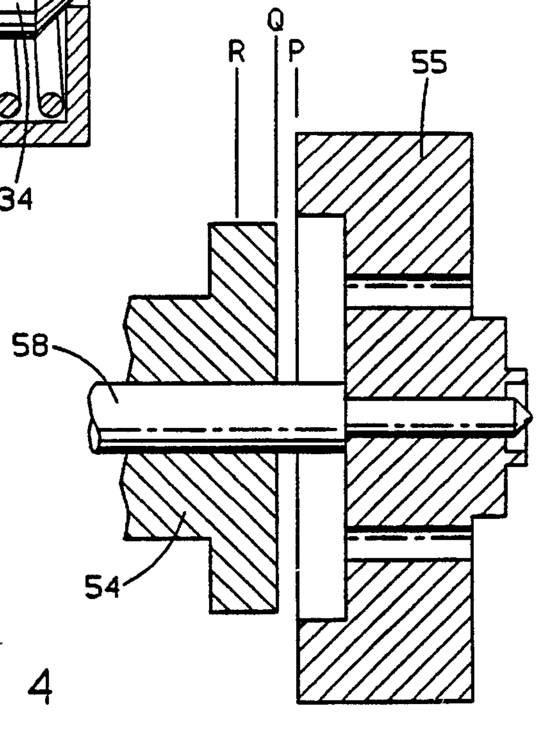
FIG. 4 is a detail sectional view of the armature and stop relationship.

Axial magnetic force versus travel characteristics are illustrated in FIG. 5. Points P, Q and R correspond with the location of the leading edge of the armature 55 in relation to stop 54 as indicated in FIG. 4. Starting at a valve closed condition which corresponds to the normal position of the armature 55, the working air gap 60 resulting from the preferred configuration of the magnetic circuit begins to decrease with initial movement of the armature between positions P and Q indicated in FIG. 4.

The working air gap in combination with the lines of magnetic flux through the gap is optimized at a point between approximately fifteen and twenty percent of the armature's travel corresponding with position Q. Therefore as shown in FIG. 5 the resulting axial magnetic force peaks early in the armature travel. Thereafter a gradual force reduction occurs as flux begins to be shunted radially between the stop 54 and the armature 55 corresponding with position R. This electromagnetic axial force performance complements the other axial forces acting upon the valve in providing a balance of forces to define equilibrium positions in the operation of the valve.

What is claimed is:

1. A flow control valve selectively openable to permit an amount of flow through a normally closed flow path, the flow control valve comprising:

- a valve housing having an inlet, an outlet and defining a segment of the flow path therebetween;
- a seat orifice in the flow path between the inlet and the outlet;
- a T-slot orifice having a longitudinal leg and a transverse leg in the flow path between the inlet and the outlet;
- a sliding poppet having a body and a tip positioned in the valve housing, the sliding poppet slidable to selectively open the normally closed flow path wherein the poppet body co-acts with the T-slot orifice and the poppet tip co-acts with the seat orifice to determine the amount the flow path is selectively opened wherein the poppet body initially opens the longitudinal leg and secondarily opens the transverse leg upon sliding open.

2. A flow control valve according to claim 1 further comprising:

- an electromagnetic actuator engaging the sliding poppet, responsive to an electrical pulse-width modulated signal with a variable duty cycle and including a coil exhibiting a non-linear build-up of average current in response to a linear increase in the variable duty cycle.

3. A flow control valve for a purge system of a vehicle having an engine and an evaporative emission control system comprising:

- a valve mechanism for selectively permitting an amount of flow through a flow path between the evaporative emission control system and the engine, wherein the valve mechanism includes a flow control means for providing flow characteristics including:
- a poppet tip coacting with a seat orifice located in the flow path to provide a no-flow characteristic;
- an equivalent clearance orifice located in the flow path in series with the seat orifice to provide, in combination, a variable opening flow characteristic;
- a slot orifice located in the flow path in series with the seat orifice to provide a gradual flow slope variable low flow characteristic and a steeper flow slope variable high flow characteristic; and
- an actuator positioning the valve mechanism to selectively provide the flow characteristics.

4. A flow control valve according to claim 3 wherein the actuator includes an electromechanical mechanism developing a variable electromechanical force in response to a variable pulse-width modulation control signal, wherein the variable electromechanical force positions the valve mechanism as a function of the variable pulse-width modulation signal and the valve mechanism's position with the variable electromechanical force reaching a greatest amount that occurs when the position of the valve mechanism corresponds to the variable opening flow and the gradual flow slope low flow range flow characteristics of the valve mechanism.

5. A flow control valve comprising:

a valve assembly having an inlet, an outlet and including;

a poppet having a cylindrical body, a shoulder and a neck terminating in an angled tip, the poppet being axially moveable;

a cylindrical sleeve defining a poppet chamber through which the poppet axially moves;

an equivalent clearance orifice defined between the poppet body and the sleeve;

a slot orifice positioned through the sleeve between the inlet of the valve assembly and the poppet chamber such that axial movement of the poppet causes the shoulder to pass along that portion of the sleeve containing the slot orifice;

a seat orifice positioned between the poppet chamber and the outlet of the valve assembly cooperating with the angled tip, wherein flow through the valve is controlled by the seat orifice, equivalent clearance orifice and the slot orifice; and an actuator positioning the poppet assembly such that poppet equilibrium positions are obtained wherein the poppet is biased to a closed position, wherein the equivalent clearance orifice controls flow when the poppet initially moves away from the closed position, wherein further movement of the poppet away from the closed position defines a first range of control positions where the slot orifice controls flow, wherein further movement of the poppet away from the closed position defines a second range of control positions where the slot orifice in series with the seat orifice, in combination, control flow.

6. A flow control valve according to claim 5 wherein the valve assembly includes a contact spring disposed around the neck of the poppet applying a contact spring force acting to axially move the poppet away from the seat orifice, the contact spring force not great enough to overcome the force of the regulation spring but great enough to overcome a fluid force that acts to draw the poppet tip toward the seat orifice.

7. A flow control valve according to claim 5 wherein the poppet includes a poppet orifice extending longitudinally through the body of the poppet to balance fluid forces on each end of the poppet body.

8. A flow control valve according to claim 5 wherein the slot orifice is configured in the shape of a T-slot with a longitudinal leg extending parallel to valve travel and a lateral leg extending perpendicular to valve travel.

9. A flow control valve according to claim 5 wherein the actuator comprises an electromagnetic actuator including a coil for establishing a variable electromagnetic force through a magnetic circuit including an armature axially moveable in response to the variable electromagnetic force, wherein a maximum electromagnetic force occurs at approximately an initial 15% to 20% of the armature's travel away from a closed position wherein the electromagnetic force opposes an adjustable regulation spring's force both forces acting axially on the electromagnetic actuator to establish the poppet equilibrium positions.

10. A flow control valve according to claim 9 wherein the actuator includes a flexure spring and a rod, the flexure spring and rod in combination providing a radial bearing for the armature.

11. A flow control valve comprising:

a valve assembly including:

a housing having an inlet port, an outlet port and a flow path defined therebetween through a poppet chamber including a slot orifice between the inlet port and the poppet chamber in the flow path and a seat orifice between the poppet chamber and the outlet port in the flow path;

a poppet disposed in the poppet chamber slidable over a length of travel, including a body having an orifice extending longitudinally therethrough, a shoulder on the body extending to a neck and an angle tip at the end of the neck disposed in the flow path such that the angled tip communicates with the seat orifice to seal the valve closed and the shoulder communicates with the slot orifice when the poppet slides along the segment of travel to variably open the slot orifice; and an actuator positioning the poppet along the segment of travel responsive to an electrical signal to position the poppet at various selected locations such that various orifice areas are opened thereby controlling the rate of flow through the flow path by selectively providing an area of open flow through the flow path.

12. An electromagnetically operated flow control valve comprising:

a valve assembly having a flow path including an inlet, a poppet chamber and an outlet;

a slot orifice disposed between the inlet and the poppet chamber in the flow path;

a seat orifice disposed between the poppet chamber and the outlet in the flow path;

a poppet contained in the poppet chamber for coaction with the slot orifice and the seat orifice to control flow through the flow path;

an equivalent clearance orifice between the poppet and the poppet chamber to provide a smooth transitional flow rate when the valve first opens;

a frame formed of ferromagnetic material connected to the valve assembly;

a coil winding supported by the frame having an axis and an axial opening for generating a variable electromagnetic force;

a stop formed of ferromagnetic material extending through the axial opening having a first end connected to the frame and a second end including an annular ring projecting radially away from the axis forming an annular air gap between the stop and the frame;

an armature, radially retained, with an annular leg movable axially through the air gap in response to the variable electromagnetic force; and a rod communicating axial movement of the armature to the poppet to position the poppet for a desired flow rate through the valve assembly orifices.

* * * * *